United States Patent [19]

Halpern

[11] 3,921,210

[45] Nov. 18, 1975

[54] HIGH DENSITY DATA PROCESSING SYSTEM

[75] Inventor: Peter H. Halpern, Longwood, Fla.

[73] Assignee: General Dynamics, St. Louis, Mo.

[22] Filed: Jan. 14, 1974

[21] Appl. No.: 432,938

[52] U.S. Cl. .......................... 360/40; 340/347 DD

[51] Int. Cl.² .......................................... G11B 5/02

[58] Field of Search ................................ 360/39, 40

[56] References Cited

UNITED STATES PATENTS 2,700,696 1/1955 Berker ........................ 340/347 DD

*Primary Examiner*—Vincent P. Canney
*Attorney, Agent, or Firm*—Martin Lukacher

[57] ABSTRACT

A data processing system applicable for high density magnetic recording and data transmission wherein digital data is translated into multi-level zero average words which occupy a greater number of time slots than the bits of the digital data which they represent, the words having increased power density in the signal spectra thereof which represent the difference between different words. After recording or transmission the signals are detected and decoded in accordance with the amplitude characteristics of samples of the detected signals occurring during time slots which are occupied by samples, the sum of which is equal to zero.

16 Claims, 16 Drawing Figures

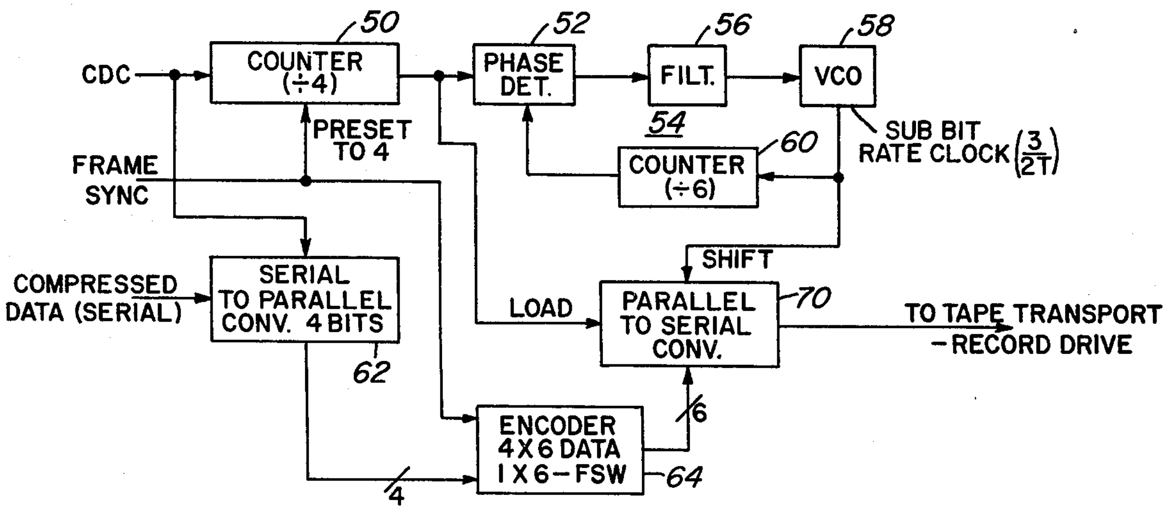
FIG. 8.
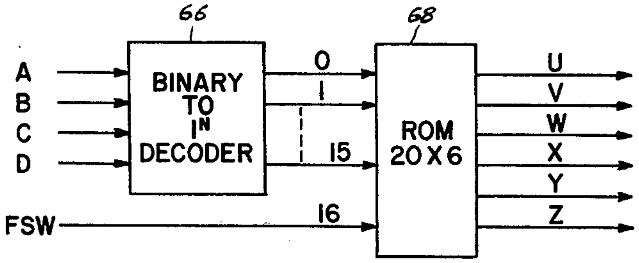
FIG. 9.
| DECIMAL | BINARY A | B | C | D | H – CODE U | V | W | X | Y | Z | SIGNAL |
|---|---|---|---|---|---|---|---|---|---|---|---|
| 0 | 0 | 0 | 0 | 0 | 1 | 1 | 1 | 0 | 0 | 0 | S1 |
| 1 | 0 | 0 | 0 | 1 | 0 | 0 | 0 | 1 | 1 | 1 | $\overline{S1}$ |
| 2 | 0 | 0 | 1 | 0 | 1 | 1 | 0 | 1 | 0 | 0 | S2 |
| 3 | 0 | 0 | 1 | 1 | 0 | 0 | 1 | 0 | 1 | 1 | $\overline{S2}$ |
| 4 | 0 | 1 | 0 | 0 | 1 | 1 | 0 | 0 | 1 | 0 | S3 |
| 5 | 0 | 1 | 0 | 1 | 0 | 0 | 1 | 1 | 0 | 1 | $\overline{S3}$ |
| 6 | 0 | 1 | 1 | 0 | 1 | 1 | 0 | 0 | 0 | 1 | S4 |
| 7 | 0 | 1 | 1 | 1 | 0 | 0 | 1 | 1 | 1 | 0 | $\overline{S4}$ |
| 8 | 1 | 0 | 0 | 0 | 1 | 0 | 1 | 1 | 0 | 0 | S5 |
| 9 | 1 | 0 | 0 | 1 | 0 | 1 | 0 | 0 | 1 | 1 | $\overline{S5}$ |
| 10 | 1 | 0 | 1 | 0 | 1 | 0 | 1 | 0 | 0 | 1 | S6 |
| 11 | 1 | 0 | 1 | 1 | 0 | 1 | 0 | 1 | 1 | 0 | $\overline{S6}$ |
| 12 | 1 | 1 | 0 | 0 | 1 | 0 | 0 | 1 | 1 | 0 | S7 |
| 13 | 1 | 1 | 0 | 1 | 0 | 1 | 1 | 0 | 0 | 1 | $\overline{S7}$ |
| 14 | 1 | 1 | 1 | 0 | 1 | 0 | 0 | 1 | 0 | 1 | S8 |
| 15 | 1 | 1 | 1 | 1 | 0 | 1 | 1 | 0 | 1 | 0 | $\overline{S8}$ |
| FSW | — | — | — | — | 1 | 0 | 0 | 0 | 1 | 1 | S9 |
ENCODING/DECODING TABLE
FIG. 10.

HIGH DENSITY DATA PROCESSING SYSTEM

The present invention relates to a system for processing data at high density and particularly to a system for high density magnetic recording and/or communication of digital information.

The invention is especially suitable for use in high density recording and play-back of digital data on multitrack magnetic record mediums, such as tapes, discs and drums. The invention may also be utilized in data processing and communication equipment in which information is handled at high density, as for pulse code modulation communication, telemetry and the like.

The handling of data at high density is especially desirable since it conserves space on record medium or data storage device. In the case of communications, high density data handling conserves time and allows more data to be transmitted over a communication channel or link than otherwise would be possible.

Various solutions have been proposed for handling and processing data at high density. Higher density enhances distortion, cross-talk, and other sources of error. Without accommodating or counteracting such errors, high density processing can be severely constrained by concomitant high error rates. A system for processing data with high data density and satisfactory error performance has not as yet been obtained.

Various systems have been suggested for processing data so that it can be encoded for high density magnetic recording or communication purposes, as well as for the detection of the data after recording or transmission. Examples of various techniques for encoding data into bipolar signals may be found by reference to the following U.S. Pat. Nos.:

3,020,526; 3,217,329; 3,226,685; 3,237,176; 3,276,033; 3,374,475; 3,356,934; 3,357,003; 3,414,894; 3,500,385; 3,508,228; 3,569,942; 3,361,428; and 3,699,556.

A technique for high density digital recording which has become popular is known as delay modulation coding (DM) which provides signal sets to be discussed more fully hereinafter in connection with FIG. 2 of the drawings. Reference may be had to the following U.S. Pat. Nos. for discussion of such delay modulation codes:

3,108,261; 3,518,648; and 3,646,534.

In an effort to still further improve the density at which data can be handled, there have been proposed ternary encoding and decoding techniques. These utilize multi-level codes, arranged, in some cases in accordance with predetermined bit patterns or formats. Examples of such multi-level code systems, which have been described as being useful for data transmission or communication purposes, may be found by reference to the following U.S. Pat. Nos.:

2,700,696; 3,133,280; 3,214,749; 3,230,310; 3,303,424; 3,378,770; 3,388,330; and 3,518,662.

Examples of such multilevel codes which are described as being especially suitable for use in high density data recording are found in the following U.S. Pat. Nos.:

3,588,836; 3,609,684; 3,641,506; and 3,713,123.

The codes which are described in U.S. Pat. Nos. 3,588,836 and 3,641,506 have the still further advantage of being of zero level durinng each formate word interval, such as to greatly facilitate detection upon reception or playback of the transmitted or recorded signals.

The various attempts to improve high density data processing as represented by the system described in the above referenced patents, have been found, in accordance with this invention to be deficient in making available energy for detection of the signals which can distinguish signals representing different data from each other; i.e., in its simplest form, distinguishing between binary 1's and 0's. It is desirable to match the spectral characteristics of the signal to the transmission channels, whether it be a magnetic record/playback system or a communications link, as by providing signals that have zero direct current content. However, for high density processing with optimal error performance, the data must be encoded into symbols, as represented by electrical signals, such that their difference signal (viz., the power density of these difference signals) is maximized. Both spectral matching and the enchancement of difference signals are needed to use the channel to its full capacity (with high data density and with the lowest occurrence of errors). The signal designs provided by the system embodying the invention have more time slots (i.e., more bits per word) than the data which the signals represent. The advantages flowing from the system provided by the invention are larger bandwidth-time products which combat impulse noise in the channel, concentrate the energy or power in the spectral region through which power is translated more efficiently by the channel, effectively increase the gain of the system by increasing the power density of the difference signals, and combat channel distortion and inter-symbol cross-talk.

It is therefore a principal object of the invention to provide an improved system for processing data at high density.

It is an ancillary object of the present invention to provide an improved system for encoding and decoding digital data so as to enable the handling thereof at high density with minimal degradation of error performance.

It is a further object of the present invention to provide an improved system for encoding digital data so as to maximize the power difference among signals corresponding to different data items, such as different groups of bits which constitute words of the data.

It is a still further object of the present invention to provide an improved system for encoding information into signals which carry the information having more energy and occupying a spectrum more compatible with the channel which carries the signals than other systems for carrying information which have heretofore been provided.

It is a still further object of the present invention to provide an improved system for processing data into the form of signals which carry the data, which signals have the advantage of a. equi-power and relative insensitivity to gain variations;

b. having amplitudes which are either of two values and adaptable for transmission or recording at saturation levels without distortion;

c. adapting for transmission and detection at different rates (viz., higher speed recording than playback or vice-versa); and d. providing increased power for detection or reception purposes.

It is a still further object of the present invention to provide an improved system for encoding digital data which provides signals having more effective power for detection (viz., distinguishing between signals) and thus reducing errors upon detection.

It is a still further object of the present invention to provide an improved system for encoding a serial stream of binary data into a format which maximizes the use of the dynamic range and bandwidth available in the magnetic recording/playback process.

It is a still further object of the invention to provide an improved system for encoding digital data which affords special symbols which can be used for control and time markers in addition to and without excluding encoded data.

Briefly described a system embodying the invention encodes digital data into words having two valued signals in which six of such signals represents four input data bits. Three of the six signals are positive and three are negative, resulting in an alphabet of words which are of zero DC average level and equal power. These words are transmitted over a channel, as by being recorded on a magnetic record and then played back therefrom. The detected or playback signals are stored and decoded synchronously with the time of occurrence of the zero average condition thereof, as by matched filters and maximum likelihood detectors. The detection process is efficient in that the power density spectra of the difference between the signals representing different words is maximized. This difference signal spectrum and the zero average property also provide an overall signal spectrum having a spectral occupancy which is closely matched to the optimum signal transmission characteristics of the channel (viz., the spectral characteristics of the magnetic recording/playback process). The maximum likelihood detector thus provides different outputs each representing the transmitted or recorded digital word upon detection thereof.

The invention itself, both as to its organization and method of operation, as well as additional objects and advantages thereof will become more readily apparent from a reading of the following description in connection with the accompanying drawings in which:

FIG. 8 is a more detailed block diagram of the encoding system shown in FIG. 6;

FIG. 9 is a block diagram of an encoding logic system which may be used in the system shown in FIG. 8;

FIG. 10 is an encoding/decoding table showing the relationship between the decimal code, binary code and the code and signals provided in accordance with the invention;

The high density code which is provided in accordance with the invention (hereinafter sometime referred to as the "H-code") and its advantages over codes which have heretofore been proposed, will now be discussed in connection with FIGS. 1 to 5.

Figure 1:
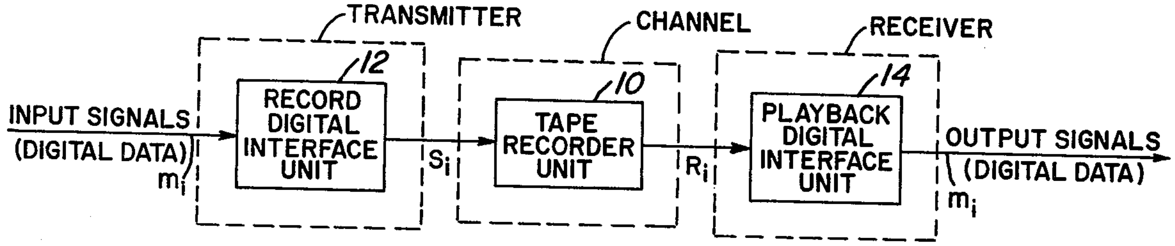
FIG. 1 is a block diagram generally describing a system embodying the invention.

FIG. 1 illustrates a generalized communication channel. The channel can contain a storage medium such as a magnetic record. The record may be a magnetic tape in a tape recording unit 10 which transports the tape and has magnetic heads for recording and playback of signals. The transmitter, which in the case of a magnetic recording system is provided by a record interface unit 12, selects a message $m_i$ from a set of input messages and encodes the message into a signal $S_i$ which is transmitted over the channel in the presence of noise. Where digital data is to be recorded, the interface unit operates with the digital data and may be referred to as a record digital interface unit. The channel is band limited and has a certain impulse response $G(t)$. Signals $R_i$ are received by the receiver in the channel, which is a recording device for digital messages in a playback digital interface unit 14. The received signals will of course be modified by the noise and other disturbance interposed by the channel. Inasmuch as the transmitted signals $S_i$ can identify various messages, the receiver must derive from the received signal $R_i$ the one of the signals $S_i$ which was actually transmitted.

In order to utilize the channel to its full capacity (vis., with high data density) and with the lowest occurrence of errors, it has been found, in accordance with the invention, that the data should be handled in a manner to optimize the energy difference in the transmitted signals. signals, Consider two signals, $S_{1(t)}$ and $S_{2(t)}$. If $S_{1(t)}$ were transmitted the received signal $R_1$ would be equal to $[S_1 + n(t)] *G(t)$ (convolution). If on the other hand $S_{2(t)}$ were transmitted, the received signal $R_2$ would be equal to $[S_2 + n(t)] *G(t)$, where $n(t)$ is the noise response of the channel. The energy available to distinguish between these two received signals, is represented by the energy difference signals which are processed by the channel and is approximately equal to $$E_d \cong \int_0^\infty \left[ \left[ S_2(t) - S_1(t) \quad * G(t) \right] \right]^2 dt. \qquad (1)$$

Codes provided by systems in accordance with the invention optimize these energy difference signals so to utilize the channel whether it be a magnetic recorder or other communications link, with lowest occurrence of errors. As compared to the delay modulation codes and the ternary code, the code provided in accordance with the invention has the greatest concentration of difference signals of high power density within the bandwidth of the magnetic record/playback processor.

Figures 2, 3, 4:
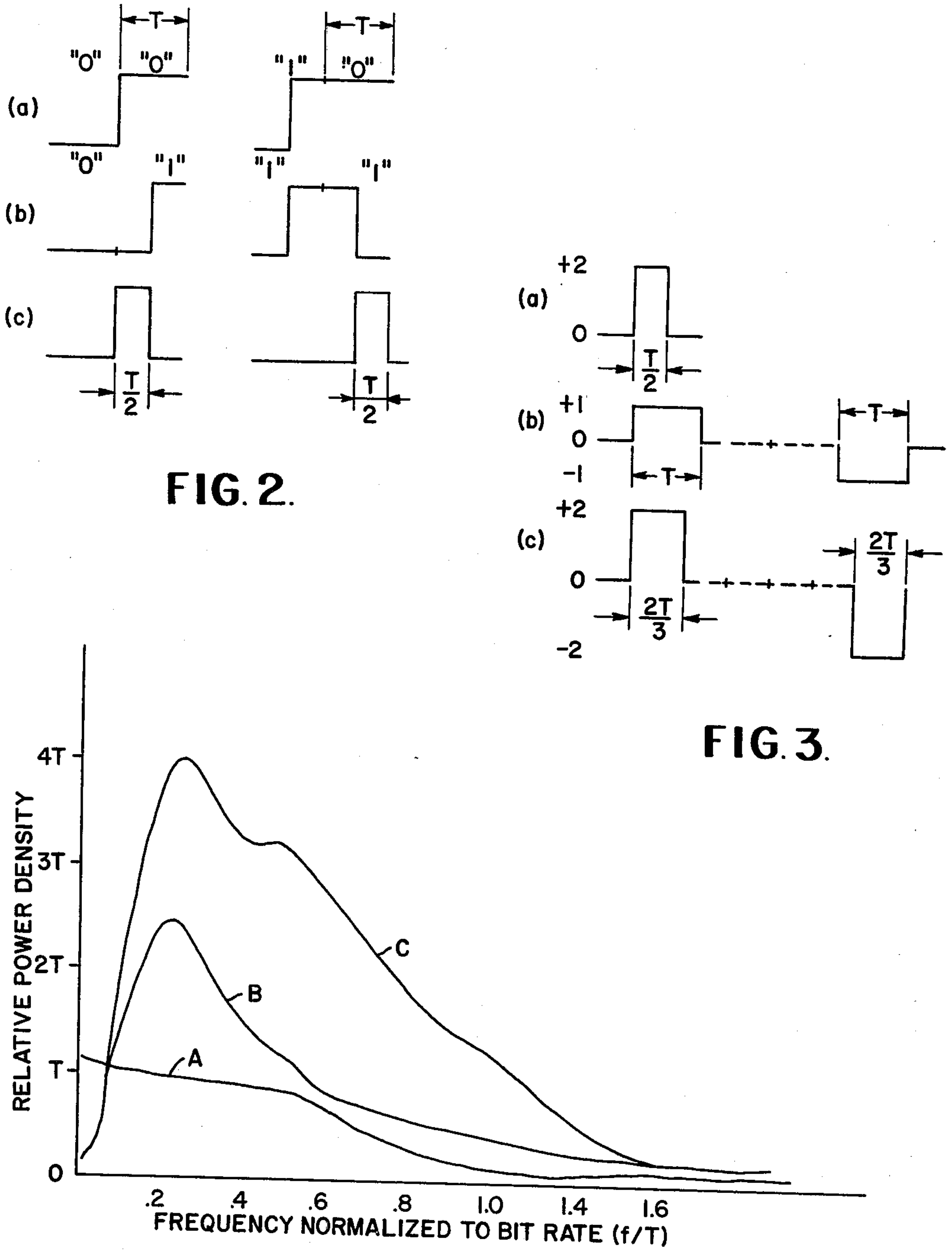
FIG. 2 is a waveform diagram representing the set of signals produced in accordance with delay modulation codes, as well as the difference signal which distinguishes the bits of such codes.
FIG. 3 is a waveform diagram which compares the difference signals produced by delay modulation codes, ternary codes, and the codes provided in accordance with the invention.
FIG. 4 is a graph illustrating the difference signals spectra for delay modulation signals, ternary signals and the signals provided in accordance with this invention.

FIG. 2 in waveforms a and b illustrate the alphabet of the delay modulation code. The difference between 1's and 0's in this code is the transition which occurs in the middle of a time slot. The difference signal which distinguishes 1's and 0's exist for one-half a time slot, or a period of time equal to T/2 where the time slot period is equal to T. This difference signal is illustrated in waveform c of FIG. 2.

Figure 5:
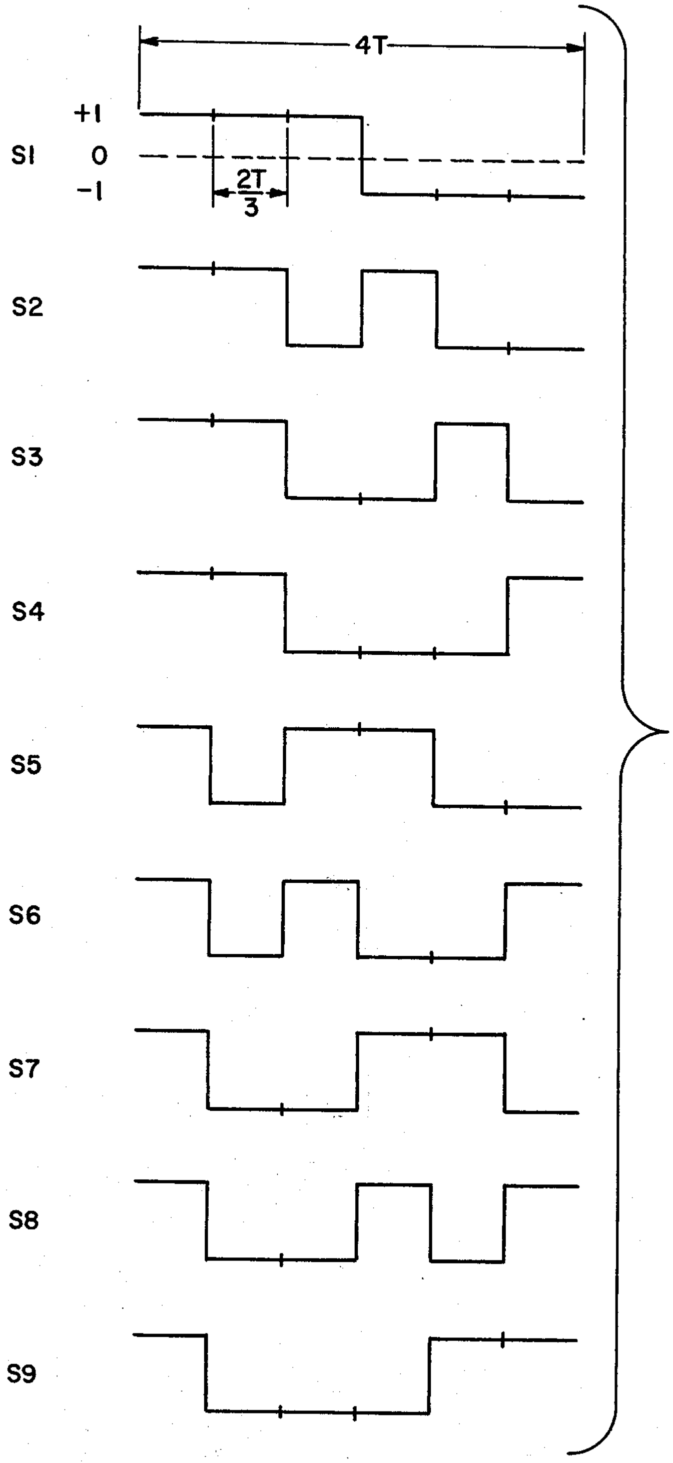
FIG. 5 is a waveform diagram illustrating the signal set of waveforms of the alphabet of signals provided in accordance with the invention.

FIG. 3 illustrates the difference signal for the delay modulation code in waveform a. The ternary code difference signals are illustrated in waveform b, while waveform c illustrates the difference signals of the code provided in accordance with this invention. The ternary code illustrated in waveform b is the zero average code discussed in U.S. Pat. Nos. 3,588,836 and 3,641,506 referenced above. In accordance with that code, four bits are encoded into a three-valued (level) system (+ 1, 0, −b). The worst case difference signal may be separated by two time slots of duration T. They also may be one time slot apart or immediately adjacent. The code provided in accordance with the invention represents four input data bits but is subdivided into six parts, each two thirds of a time slot in duration. The system is two valued (+1, −1) and has an alphabet or set of twenty signals. Nine of these signals are shown in FIG. 5. The signal made up of alternate 1's and 0's (viz., alternate +1 and −1 levels) is not shown, since it is avoided in order to reduce the high frequency spectral occupancy of the difference signals. In addition to the nine different signals shown in FIG. 5, the complements thereof are also available providing an alphabet of 18 different signals in the set. the worst case difference signals are as illustrated in waveform c of FIG. 3. These signals are pulses of opposite polarity and two-thirds of a time slot, T, in duration which can be separated by four sub-divided time slots, as shown, or by three, two, or one of the time slots. They may also be adjacent to each other.

The minimum difference signals spectra for these three codes is shown in FIG. 4. The power density spectra of signals due to the delay modulation code is illustrated in Curve A and is far inferior to the spectra of the zero average ternary codes illustrated in Curve B. The code provided by the invention is, as illustrated in Curve C, optimized to provide the greatest power density difference signals spectra over the entire bandwidth. The difference frequency spectra may be calculated from the normalized auto-correlation function of the worst case difference signals illustrated in FIG. 3. Thus, the power which is available for distinguishing between 1's and 0's for the delay modulation code is $$P_{DM}(f) = \left[\frac{\sin \pi f/2}{\pi f/2}\right]^2 \qquad (2)$$

where $f$ is the bit rate. The resulting power spectrum of the zero average ternary code is $$P_T(f) = \frac{8}{3} r \left[\frac{\sin^2 \frac{2\pi fr}{2}}{\left(\frac{2\pi fr}{2}\right)^2} - \frac{\sin^2 (2\pi fr)}{(2\pi fr)^2}\right] \qquad (3)$$

where $r$ is the period of the time slot, shown in FIG. 3, as T. The power spectrum of the difference signal obtained from the codes provided in accordance with the invention is $$P_H(f) = 4.26r \left[\frac{\sin^2 \frac{2\pi fr}{3}}{\left(\frac{2\pi fr}{3}\right)^2} - \frac{\sin^2(2\pi fr)}{(2\pi fr)^2}\right] \qquad (4)$$

The plots of these equations are shown in FIG. 4. It will be apparent that a communication system using the codes provided by the invention has gain in that the energy of its difference signals is increased by virtue of the coding. The code also provides signals which are especially suitable for high density magnetic recording by virtue of the absence of direct current energy in each word. Recording systems can not effectively support direct current frequency components. In addition, the recorded signals are square wave in nature and are compatible with magnetic records which are inherently peak limited. This facilitates saturation recording enabling the maximum storage of energy in the medium and in the recorded difference signals. The facility for saturation recording and/or transmission obviates the gain problem. The system may be hard limited both on recording and playback, thus avoiding the need for automatic gain control as is usually necessary where linear recording is used.

Figure 6:
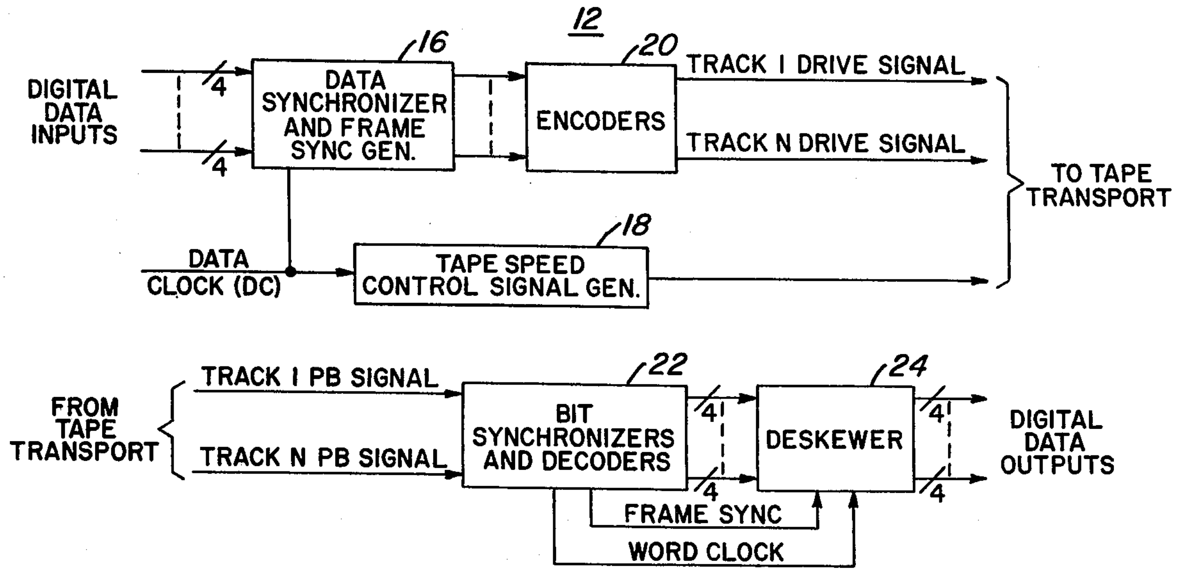
FIG. 6 is a block diagram of a magnetic recording/playback system provided in accordance with the invention.

Referring to FIG. 6, there is shown a system for recording and playback digital data on a multi-track tape recording device which may be an instrumentation type tape recorder of the type which is commercially available. Such tape transports are capable of recording a large number of tracks in parallel on a single tape, for example 14 tracks or more. The track nearest one end of the tape will be referred to as Track No. 1 while the track on the nearest opposite edge of the tape will be referred to as Track N. The center track will be referred to as the N/2 track and may be used as a reference track on playback. N sets of parallel data inputs each having a plurality of lines for being mentioned herein for purpose of this discussion are applied to a record digital interface unit 12. This unit 12 contains a data synchronizer and frame sync generator 16 to which the digital data inputs are applied. The synchronizer and frame sync generator is operated by a data clock (DC) such that the recording can be synchronized and coherent with the clock. The speed of the tape and the tape transport is also made coherent with the clock by the use of a tape speed control generator 18. This generator may include a phase lock loop containing preset dividers so as to provide tape speed control signals which are integral sub-multiples of the clock, or synchronous therewith. These tape speed control signals may be applied to a synchronous motor in the tape transport for accurately controlling the speed of the capstan which drives the tape or such other tape drive mechanism as is used in the tape transport. The synchronizer 16 provides data and frame sync signals synchronous with the clock to encoders 20 which encode the data in accordance with the code provided by the invention into the signals illustrated in FIG. 5 (viz., $S_1$ to $S_9$ or their complements). In some systems it is more convenient to reserve two signals for frame synchronization in order to avoid sensitivity to pattern data. The symbols $S_1$ and $S_1$ of FIG. 10 will allow the breaking of false signal lock (repetitive signals which have adjacent bits which can be taken as good zero average words). A signal is reserved for the frame sync word and another signal is available for a special word that is not shown as being used herein in order to simplify the discussion of the invention.

Seventeen of the eighteen available signals or codes in the alphabet are thus utilized. These 17 signals are indicated by the numbers 0 to 15 and FSW in the column headed "decimal" in the encoding/decoding table shown in FIG. 10. The code provided by the invention is shown in the table headed H-code. The binary words ABCD and the H-code words UVWXYZ as well as the signals to which they correspond are all shown in the same row of the encoding/decoding table. The operation of the system in encoding the binary words into the H-code signals will be discussed hereinafter in connection with FIGS. 8 and 9. The encoders 20 output tape drive signals for each of the tracks 1 to N. These signals may be applied to amplifiers in the tape transport which drives the magnetic heads for recording the signals on each of the tracks. Each signal occupies six time slots and is one of two values in each of the slots such that saturation recording may be accomplished.

Playback signals are derived from each of the tracks of the tape in the tape transport. These playback signals are inputted to bit synchronizers and decoders 22 of the playback digital interface unit 14. In the synchronizers, clocks are developed at the sub-bit rate (six time slots per word) and at the word rate utilizing the zero average characteristic of the code. Decoding is accomplished by means of a matched filter/maximum likelihood detection technique so as to obtain the binary data word on N outputs each having four lines for each of the binary bits of the word. These outputs together with frame sync and word clocks are applied to a deskewer 24 which removes timing jitter (viz., static and dynamic timing errors) which may be introduced in the tape transport. The deskewed words may be applied to buffer registers (not shown) and clocked out by the utilizing equipment such as the computer or data handling equipment which utilizes the digital data output.

Figure 7:
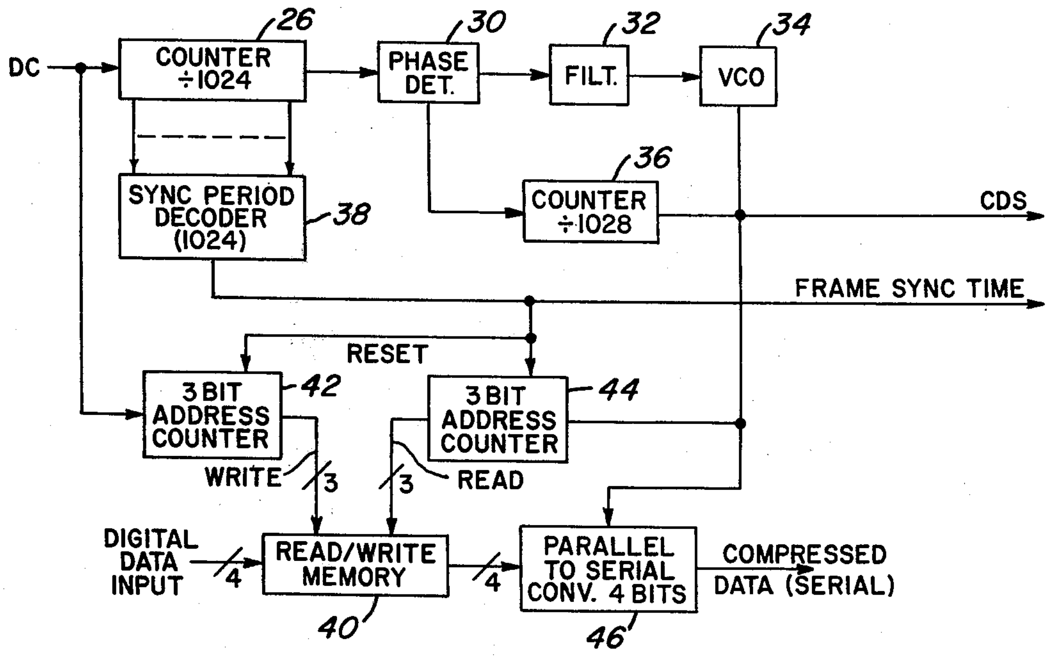
FIG. 7 is a more detailed block diagram of the data synchronizer and frame sync generator of the system shown in FIG. 6.

In order to provide for the insertion of frame sync words, data compression is provided for in the data synchronizer 16. The data compression sub-system for each of the tracks is illustrated in FIG. 7; one such subsystem being provided for each track. For purposes of this explanation a frame is taken as containing 1,024 bits or 256 4-bit binary words. The data clock DC is divided by 1,024 in a counter 26. The counter 26 provides one input to a phase lock loop 28 consisting of a sequential phase detector 30, a loop filter 32, a variable frequency oscillator such as a voltage controlled oscillator (VCO) 34, and a divide by 1028 counter 36. Thus when the VCO outputs a compressed data clock (CDC) having a rate equal to 257/256 times the data clock rate, the loop 28 will be locked.

A sync period decoder 38 provides an output when the counter 26 reaches a full count of 1024. This decoder may be a gate connected to the stages of the counter which provides an output pulse when the counter is full. This output pulse designates the frame sync time (the time when a frame sync word is to be loaded or inserted into the output data stream).

An input/output memory indicated as a read/write memory 40 having a capacity of 8 bits is used to provide a small amount of buffer storage to allow for asynchronous read-in of input data. The data arriving on the four input lines for the track is read into different positions in memory under the control of a 3-bit address counter 42 which counts the data clock. The data is read out of the memory 40 by three read line outputs from another 3-bit address counter 44 which reads the compressed data clock. Each time a frame sync pulse occurs both counters are reset to addresses 180° out of phase such that the same digital data input word will be read out immediately before and during the frame sync time. This will prevent loss of a data word since the frame sync word will be encoded under the control of the frame sync pulse during the frame sync time. The four output lines from the memory 40 are applied to a 4-bit parallel to serial converter 46 and are shifted out at the compressed data clock rate to provide serial compressed data for encoding purposes.

In order to convert the binary data words into the H-code data words occupying six time slots at a sub-bit data rate rather than the four time slots at the input data rate, the subsystem shown in FIG. 8 is provided; one such sub-system being allocated to each track. The sub-bit rate clock which occurs at a rate of $3/2t$ where $t$ is the input data rate, is generated by a divide-by-four counter 50 which is present to a full count by the frame sync pulse in order to insure that the frame sync word will be encoded and read out to the tape transport as a record drive signal upon occurrence thereof. The output of the counter 50 is connected to a phase detector 52 of a phase lock loop 54. The loop consists of a loop filter 56, a voltage controlled oscillator (VCO) 58 and a divide-by-six counter 60. Accordingly, when the VCO 58 provides the clock at a sub-bit rate exactly 3/2 of the compressed data clock rate, the loop will be locked.

The serial compressed data from the converter 46 is applied to a serial to parallel converter 62 from which it is read out by the compressed data clock in the form of four bit binary words each containing the bits ABCD as shown in the encoding/decoding table of FIG. 10. These binary words and the frame sync pulse are applied to an encoder 64 which may contain combinatorial logic for converting the four data words into the 6-bit H-code words in accordance with the table given in FIG. 10. The frame sync pulse has priority over the data words and the encoder has logic for encoding this frame sync pulse when it occurs into a 6-bit frame sync word. The six bits are the bits UVWXYZ as shown in the Table of FIG. 10.

The encoder may use a read-only memory (ROM) 66 as shown in FIG. 9. These memories are available in integrated circuit form and may have 20 inputs each of which, when enabled, provides a 6-bit output (viz., a different combination of the bits UVWXYZ) in accordance with the H-code as set forth in the Table of FIG. 10. The enabling signals are applied to the input lines of the memory by a binary $1^N$ decoder 68. In other words, different combinations of the binary bits ABC and D as shown in the Table of FIG. 10 will provide an output which may be a binary 1 level on different ones of the sixteen output lines labelled 0 to 15. These lines correspond to different ones of decimal numbers 0 to 15 appearing to the left of the binary word column in FIG. 10. A level on one of these binary to $1^N$ decoder 68 output lines will result in the corresponding H-code word at the output of the read-only memory. When a frame sync word occurs on the 17th input line to the memory 66 the H-code word four frame sync will be outputted on the six output lines.

The six output lines from the encoder are applied to the parallel inputs of a parallel to serial converter 70 and are loaded therein by a load pulse produced when the counter 50 counts to four. In other words, for each data word time a consecutive H-code word will be applied to the converter 70. These words are shifted out of the converter 70 at the sub-bit clock rate by the sub-bit clock pulse from the VCO 58 and are applied as drive signals to the tape transport for recording on one of the tracks of the tape. Accordingly, for each word time a different symbol in the form of one of the signals $S_1$ to $S_8$ or its complement or the signal $S_9$ will be recorded in six consecutive time slots. These signals will each be of zero average level and although recorded consecutively are distinguishable in accordance with their zero average characteristics. Moreover, the spectral distribution of these signals is matched to the spectral response of the magnetic record playback process. With the energy or power density of the difference signals which distinguish them from each other occupying the portion of the response characteristics of the magnetic recording playback process which is most favorably matched thereto. In other words the spectral response of the magnetic record/playback process closely approximates the curve C of FIG. 4.

Figure 11:
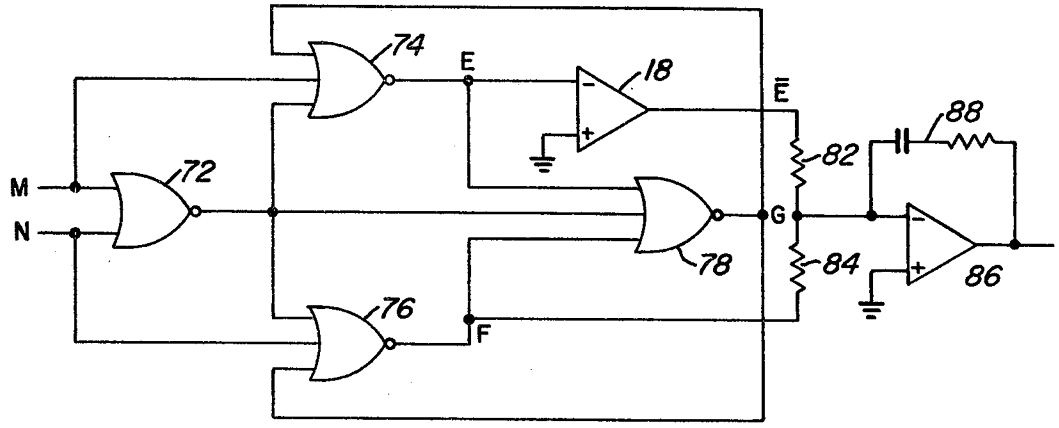
FIG. 11 is a block diagram illustrating a phase detector which may be used in the system shown in FIGS. 7 and 8.
Figure 12:
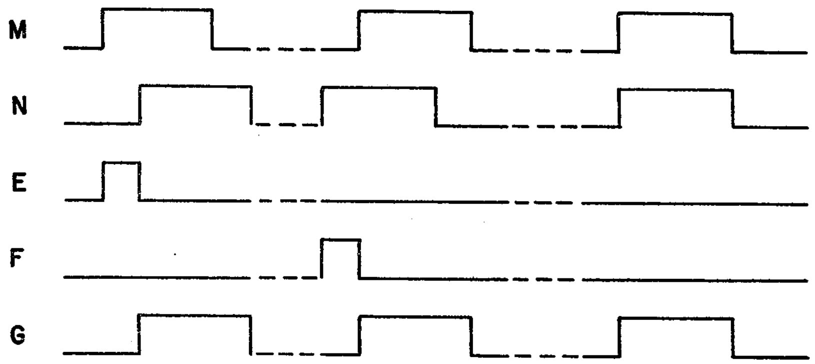
FIG. 12 is a waveform diagram illustrated in the operation of the phase detector shown in FIG. 11.

Inasmuch as the signals applied to the phase detectors 30 and 52 of the phase locked loop 28 and 54 are pulse signals, a sequential phase detector as shown in FIG. 11 and provided by the present invention may be used. This phase detector reduces frequency jitter by providing signals which go to zero when the loop is locked. The detector consists of four NOR gates 72, 74, 76 and 78 and an inverter 80. The input signals to the detector are indicated as the pulses M and N. FIG. 12 shows these pulses, first with N leading M, then with M leading N and finally with both M and N in phase or locked. The NOR gates 72 to 78 are interconnected to each other as topologically shown in FIG. 11. Due to these connections an output pulse will be produced from the gate 74 at E when input M leads input N and only at the output F of gate 74 when input N leads input M. In other words there is an output E only for the time when the rising edge of M leads the rising edge of N. On the other hand the output F occurs only for that time when the rising edge of M leads the rising edge of N. When the rising edges of M and N are coincident there is essentially no ouput at either E or F. To synthesize this control function a slave output G is provided by the gate 78. Z occurs (viz., a binary 1 level) on the occurrence of both M and N and a binary 0 level when both M and N are absent (viz., upon occurrence of $\overline{M}$ and $\overline{N}$).

The Boolean algebra equations which define the sequential circuit illustrated in FIG. 10 are $$E = M\,\overline{N}\,\overline{G}$$
$$F = \overline{M}\,N\,\overline{G}$$
$$G = G(M+N)+\overline{MN}$$

The inverter 80 is provided to permit subtraction to obtain the difference of E and F in a summing circuit shown as consisting of two resistors 82 and 84. The output of the summing circuit is applied to the loop filter consisting of an operational amplifier 86 with an integrating circuit 88 in its feedback path.

Figure 13:
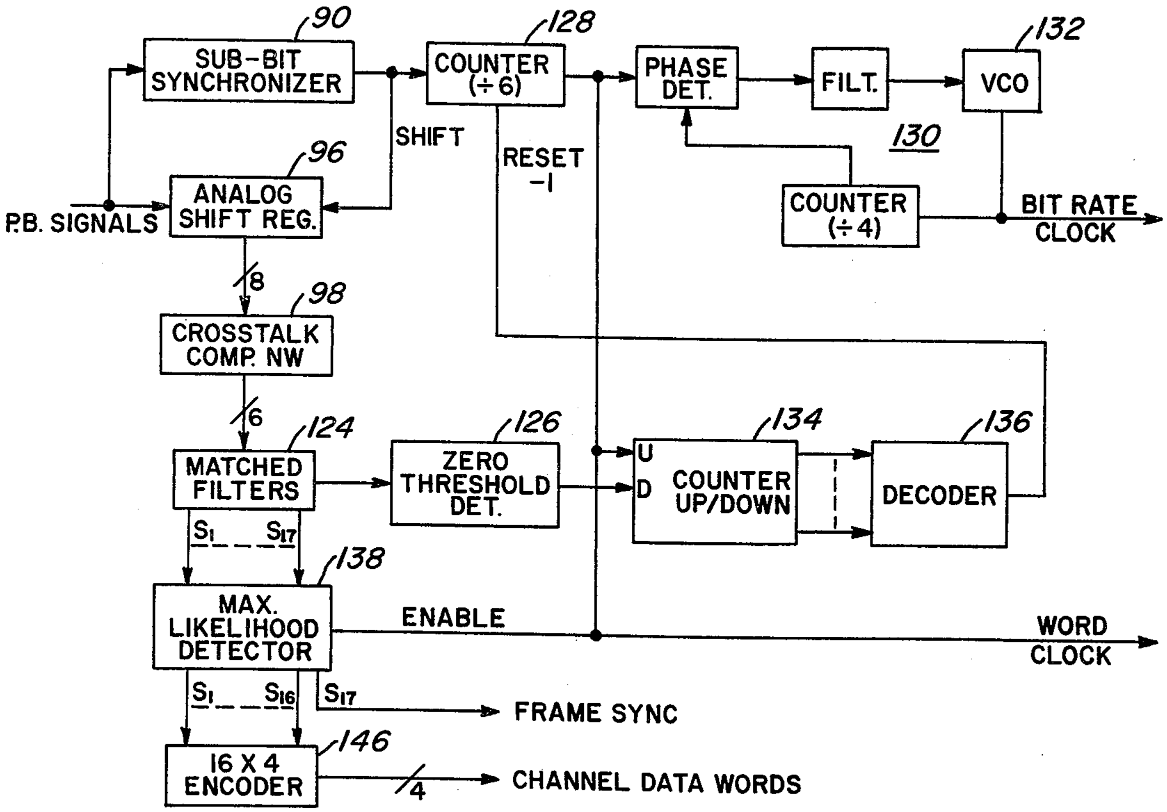
FIG. 13 is a block diagram of the bit synchronizers and decoder of the playback portion of the recording system shown in FIG. 6.

The bit synchronizers are decoders 22 for one of the tracks is illustrated in FIG. 13. The playback signals arrive and are applied to a sub-bit synchronizer 90 which may be constituted of a narrow band filter 92, the output of which locks a phase lock loop 94 which is tuned to the sub-bit rate adjusted considering the tape speed. This may be accomplished by dividers in the phase lock loop which are operated by the tape speed selection controls (see FIG. 14). The sub-bit synchronizer 90 provides shift signals to an analog shift register 96.

Figure 14:
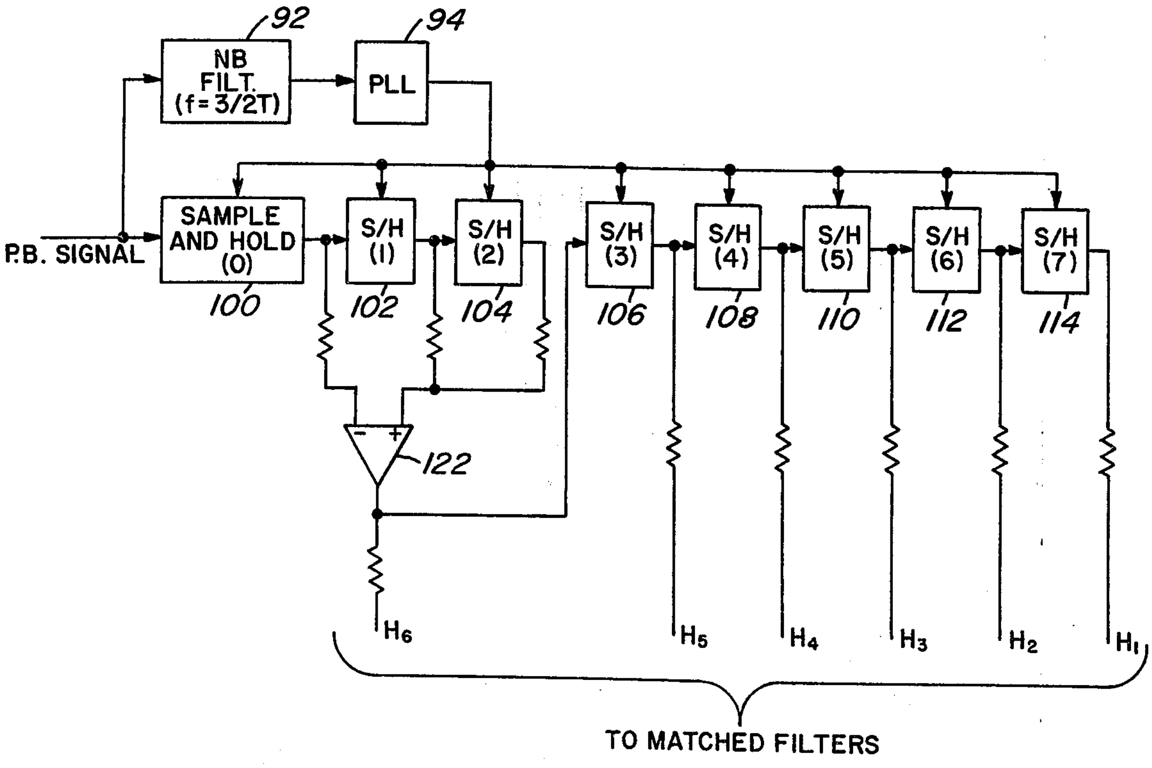
FIG. 14 is a more detailed block diagram showing the sub-bit synchronizer, analog shift register and cross-take compensation network of the system shown in FIG. 13.

This register, as shown in FIG. 14 may contain 8 sample and hold stages which is two more than are required to hold the six bits of the H-code symbol the two extra stages being provided for use in connection with a cross-talk compensation network 98. As shown in FIG. 14, the sample and hold stages 100 to 114 are all clocked simultaneously by the sub-bit rate clock. These clocks act essentially as shift pulses since they allow the sample stored in the preceding stage to be transferred to the succeeding stage. There are a total of eight output lines from the shift register 96. Three of these, however, are used to supply signals to a cross-talk compensation network. Cross-talk is directed at least to a first order of magnitude by using adjacent sub-bits. Samples of the three adjacent bits are therefore applied through resistors 116, 118 and 120 to a summing network shown as an operational amplifier 122. The adjustment of the resistors 116 and 120 may be provided so that approximately 5% of the prior bit is subtracted and 5% of the subsequent bit is added to provide a cross-talk compensated output. The exact amount of adjustment may be determined experimentally. The output of the cross-talk compensation network provides an input to the next sample and hold stage of the register such that the register provides the sixth output samples $H_1$ through $H_6$, each corresponding to six consecutive H-bits UVWXYZ, as they are reproduced from the tape.

These six bits are applied on six output lines to a set of seventeen matched filters 124. These filters may be formed from a matrix of resistors. Each matched filter is a template of one of the seventeen H-code symbols which are approximated by linear sums and differences of the six outputs $H_1$ to $H_6$. Reference may be had to the above-mentioned U.S. Pat. No. 3,588,836 which discusses the construction of formation networks for further information respecting the design of the matched filters. A matched filter is also provided for detecting the zero average characteristics which occurs synchronously with each valid H-code symbol. This matched filter may be in the form of a threshold detector 126 which provides an output when the sum of the signals from each of $H_1$ to $H_6$ is zero. This output is used to obtain word synchronization (viz., to insure that valid words are detected upon occurrence of the zero conditions).

In order to provide a bit rate clock the sub-bit clock from the synchronizer 90 is divided by 6 in a divide-by-six counter 128 and then is applied to a phase lock loop 130 which effectively multiplies the sub-bit clock by 3/2. The phase detector multiplies the sub-bit clock by 3/2. The phase detector 130 includes a voltage controlled oscillator 132 which operates at a bit clock rate. Accordingly when the bit clock is synchronous with the sub-bit clock the loop 130 will be locked.

If there are any significant number of departures of the sub-bit clock from the word clock rate (viz., when the word clock is out of synchronism with the bit-rate clock) the divide-by-six counter 128 will be reset by a predetermined count, say −1 (i.e., reset to a count of 5). Such reset is accomplished through the use of an up-down counter 134 which counts up for each word clock pulse derived from the counter 128 and down for each word clock pulse derived from the zero threshold detector 126. The counter accumulates "hits and misses". When there are a predetermined number of hits or misses, say when the counter reaches either +3 or −3 counts, a decoder 136 provides the output which resets the counter 128. Thus, the selected phase of the word clock is rejected and different phases are tried until the clock is synchronism with the occurrence of the zero average condition.

Figure 15:
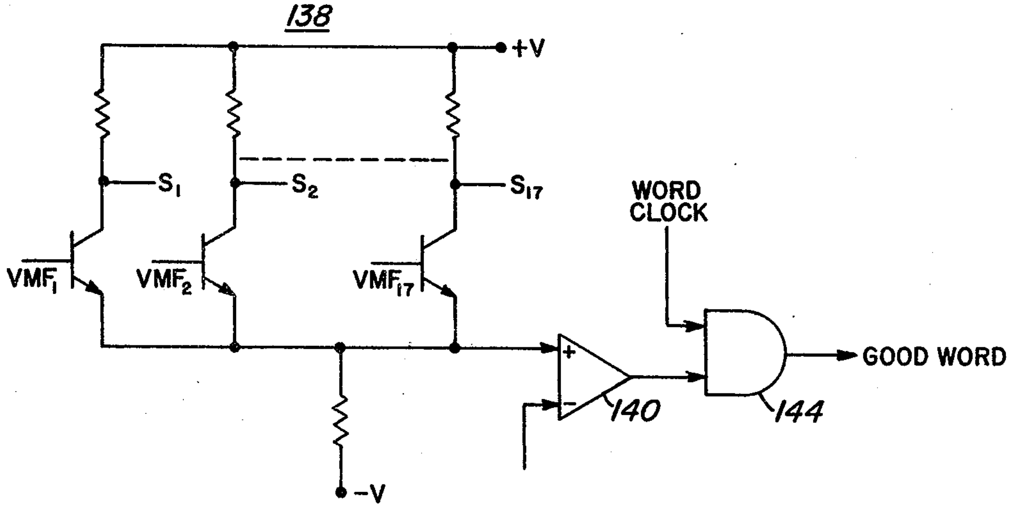
FIG. 15 is a schematic diagram of the maximum likelihood detector shown in FIG. 13.

The word clock enables a maximum likelihood detector 138 to produce an output on one of 17 output lines depending upon which of the 17 matched filter outputs is of greatest amplitude. As shown in FIG. 15 such a maximum likelihood detector may be a 17 input cpmparator in the form of a current switching circuit containing 17 transistors each having a base input from a different one of the matched filters, these base inputs being indicated as voltages $VMF_1$ through $VMF_{17}$. Only one of the outputs $S_1$ to $S_{17}$ will be negative, which will be the output having the highest VMF input signal applied to the transistor connected thereto, since the voltage at the emittter of all of the transistors except for the transistor having the highest base input, will be sufficient to drive it to cut off. In order to determine if the encoded word is a good or valid word, the emitter voltage is applied to a comparater 140 which has a threshold voltage $V_t$ connected to one of the inputs thereof. The output of the comparator if above the threshold and concurrent with the word clock is taken to be a good or valid word. In the absence of such a good word signal an error is indicated and the decoded word is not used.

The outputs of the maximum likelihood detector are the frame sync signal and 16 other outputs which are applied to a 16 × 4 encoder 146. The encoder may be a combinatorial logic circuit which provides different four bit output words depending upon which of the different sixteen outputs $S_1$ through $S_{16}$ is provided from the maximum likelihood detector 138. In other words it encodes the 16 outputs as shown in the decimal column in the table 10 into the corresponding 16 binary words shown in the binary column of that table.

Figure 16:
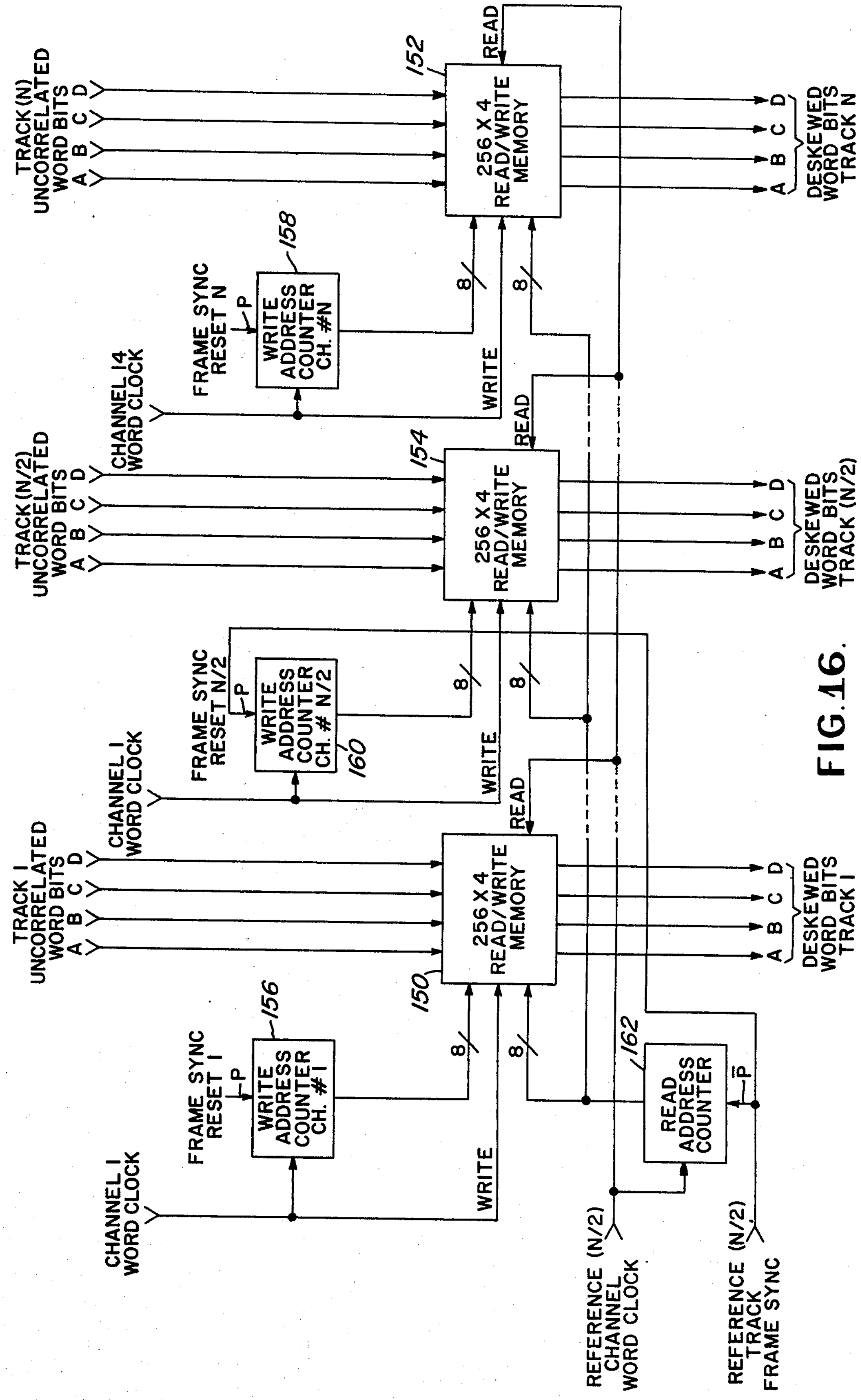
FIG. 16 is a block diagram illustrating the deskewer shown in FIG. 6.

Since tape transports contain varying degrees of timing displacement between tracks due to static and dynamic timing errors, it is desirable to re-time the data to remove sudh errors. One track, preferably the center or N/2 track is used as a reference and the other tracks are retimed or deskewed with reference thereto. A deskewer which may be used for this purpose is shown in FIG. 16. It contains read/write memories having capacity for 256 4-bit data words; one memory being provided for each of the tracks. Only the memories 150, 152, and 154 for the first, the Nth and the N/2 or reference channels (CH) or tracks are shown to simplify the illustration. In order to read data which is obtained from the encoders (146, FIG. 13) for each of these tracks into its corresponding memory, address counters 156, 158 and 160 are provided. The address counters illustrated are only those provided for this first, the Nth and the N/2 tracks. These counters are reset by the sync pulses derived from the maximum likelihood detectors 138 for their respective tracks. The address counters also count a word clock pulses for their respective tracks so as to establish addresses in the memory in which different words will be written. Upon occurrence of each word clock a data word will be written into the selected address. This is the data word which occurs in synchronism with the word clock. Accordingly sequentially reproduced words from each of the tracks will be written into different locations in the memories for their respective tracks.

In order to read the words out in synchronism with the words reproduced from the reference track, a read-address counter 162 is provided which counts the reference track word clock. This reference track word clock is also applied to each of the memories as a read command. The read address counter is reset by the reference track frame sync pulse. However, in order to insure that the read cycle does not occur at the same time as a write cycle for the same data word, the read-address counter 162 is reset 180° out of phase with the write-address counter 160 for the N/2 track by the reference track frame sync pulse. There will be a slight delay between writing and reading from the memories 150, 152 and 154 in the deskewer. It is desirable that the deskewed word bits from each of the memories be stored in buffer registers (not shown) and read out either serially or in parallel by command pulses from the user equipment (viz., from the computer which uses the high density data processing equipment) hereinabove described.

From the foregoing description it will be apparent that there has been provided an improved system for processing data at high density. While the system has been described with reference to the magnetic recording and reproducing of digital information, it will be apparent that the invention affords a new and unique code which provides optimal high density data processing for data communications and other information handling purposes. Variations and modifications in the herein-described system will undoubtedly suggest themselves to those skilled in the art. Accordingly, the foregoing description should be taken as illustrative and not in any limiting sense.

What is claimed is:

1. A system for processing digital data for high density magnetic recording which comprises means for providing consecutive words each constituted of a certain number of bits of said data, and means for encoding said words into different signals representing different ones of said words, said signals being of predetermined duration and having a spectral response characteristics matched to the spectral response of the magnetic recording system with the power density of the difference between said different signals of optimal magnitude.

2. The invention as set forth in claim 1 wherein encoding means includes means for providing said signals with a duration extending over an even number of time slots, each containing a predetermined signal level, the sum of said levels being equal to zero.

3. The invention as set forth in claim 2 wherein said means for providing said words includes means for providing said words with an even number of bits.

4. The invention as set forth in claim 3 wherein said even number of bits is four and said even number of time slots is six.

5. In a system for magnetic recording of digital data, means for translating a first number of bits of said data into digital words during a first number of time slots, means for encoding said words into format words having a second number of bits, means for providing drive signals for recording of said format word bits during a second number of time slots having a total duration equal to that of said first number of time slots.

6. The invention as set forth in claim 5 wherein said encoding means includes means for providing said format words in the form of signal levels of opposite polarity, the average value of which is zero.

7. The invention as set forth in claim 6 wherein said drive signal providing means includes means for providing said signal levels of magnitude for driving the magnetic recording medium into saturation.

8. The invention as set forth in claim 7 wherein said first number and second number of time slots are both even.

9. The invention as set forth in claim 8 wherein said first number is 4 and said second number is 6.

10. The invention as set forth in claim 6 wherein said encoding means includes means having storage for an alphabet of said format words all of which have said zero average, each corresponding to a different one of said digital words, and means responsive to said digital words for outputting the format words corresponding thereto.

11. The invention as set forth in claim 10 wherein said storage means has storage for at least one additional zero average format word in said alphabet, means for generating a sync pulse after each time is given multiple of said first number of time slots have occurred, and means operated by said sync pulse for operating said storage means for outputting said additional zero average format word.

12. The invention as set forth in claim 6 further including means responsive to signals reproduced from the magnetic recording of said zero average format words during a number of third time slots each corresponding to a different one of said second number of time slots for storing said signals, means responsive to said stored signals for deriving a word clock synchronous with the occurrence of stored signals which have zero average amplitude, and means responsive to said word clock and to said stored signals for deriving said digital data words which have been recorded.

13. The invention as set forth in claim 12 wherein said signal responsive means includes an analog shift register and means responsive to the rate at which said signals are reproduced for deriving a sub-bit clock for shifting said signals along said register.

14. The invention as set forth in claim 13 wherein said means for providing said word clock includes means for dividing the rate of said sub-bit clock by said second number to provide said word clock, means responsive to the occurrence of said zero average for changing said second number when said word clock and the occurrence of said zero average remain out of synchronism for a plurality time of occurrence thereof.

15. The invention as set forth in claim 14 wherein said means for deriving said recorded digital data includes a plurality of filters each matched to a different one of said words, a maximum likelihood detector connected to said matched filters and enabled by said word clock for selecting the format word corresponding to the signal stored in said register, and means responsive to said detector outputs for encoding said outputs into the digital word corresponding thereto.

16. The invention as set forth in claim 15 wherein said drive signals are recorded on different ones of a plurality of tracks on a magetic record, each carrying a train of consective format word signals, and a plurality of said means responsive to the signals reproduced from said recording, each for a different one of said tracks, a plurality of said means responsive to said stored signals for providing a different one of said word clocks each for a different one of said tracks, and plurality of means for deriving said data words, and further comprising a system for deskewing said data words including a read/write memory for having storage for a plurality of said data words for each of said tracks, means responsive to the word clock for each track for writing said data consecutively into the memory therefor, and means responsive to the word clock for a reference one of said tracks for reading data words simultaneously out of said memories.

* * * * *